United States Patent
Ahuja et al.

(10) Patent No.: US 9,819,933 B2
(45) Date of Patent: Nov. 14, 2017

(54) AUTOMATED TESTING OF MEDIA DEVICES

(71) Applicants: Sudhir R. Ahuja, Little Silver, NJ (US); Mauricio Cortes, Scoth Plains, NJ (US)

(72) Inventors: Sudhir R. Ahuja, Little Silver, NJ (US); Mauricio Cortes, Scoth Plains, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 349 days.

(21) Appl. No.: 14/057,029

(22) Filed: Oct. 18, 2013

(65) Prior Publication Data

US 2015/0109461 A1 Apr. 23, 2015

(51) Int. Cl.
*H04N 17/00* (2006.01)
*H04R 29/00* (2006.01)

(52) U.S. Cl.
CPC ........ *H04N 17/002* (2013.01); *H04R 29/007* (2013.01); *H04R 29/00* (2013.01)

(58) Field of Classification Search
CPC ........................... H04N 17/002; H04R 29/007
See application file for complete search history.

(56) References Cited

U.S. PATENT DOCUMENTS

| | | | | |
|---|---|---|---|---|
| 7,015,976 B1* | 3/2006 | Orr | .......................... | H04N 5/14 348/578 |
| 2002/0105581 A1* | 8/2002 | Masaki | .............. | H04N 5/23225 348/229.1 |
| 2004/0135825 A1* | 7/2004 | Brosnan | ................ | G06F 3/0317 715/857 |
| 2005/0162624 A1* | 7/2005 | Miyasaka | .............. | G03B 21/14 353/101 |
| 2006/0080579 A1* | 4/2006 | Rothman | ............ | G06F 11/3664 714/43 |
| 2008/0004748 A1* | 1/2008 | Butler | .................... | G06Q 30/02 700/244 |
| 2009/0216519 A1* | 8/2009 | Parthasarathy | ..... | G06F 9/45558 703/24 |

(Continued)

*Primary Examiner* — Henry Tsai
*Assistant Examiner* — John Roche
(74) *Attorney, Agent, or Firm* — Tong, Rea, Bentley & Kim, LLC

(57) ABSTRACT

A device testing capability is presented herein. The device testing capability supports automated testing of media devices (e.g., cameras, microphones, speakers, or the like) for verifying that the media devices are functioning properly. The device testing capability may support automated verification by an endpoint that one or more media devices or one or more sets of media devices associated with endpoint are functioning properly. For example, the device testing capability may support automated verification by a computer that a camera associated with the computer is functioning properly. For example, the device testing capability may support automated verification by a computer that a speaker and a microphone that are associated with the computer are functioning properly. The device testing capability may support automated verification, by a management system, of the proper functioning of media devices associated with endpoints in a set of endpoints.

17 Claims, 6 Drawing Sheets

(56) References Cited

U.S. PATENT DOCUMENTS

| | | | | |
|---|---|---|---|---|
| 2011/0102742 A1* | 5/2011 | Miyasa | ............... | A61B 3/102 351/206 |
| 2012/0128134 A1* | 5/2012 | Pappas | ............... | H04M 3/2236 379/1.01 |
| 2012/0140231 A1* | 6/2012 | Knox | ............... | G01N 21/53 356/442 |
| 2014/0094993 A1* | 4/2014 | Johnson | ............... | H04N 17/002 701/1 |

* cited by examiner

AUTOMATED TESTING OF MEDIA DEVICES

TECHNICAL FIELD

The disclosure relates generally to media devices and, more specifically but not exclusively, to testing of media devices.

BACKGROUND

The use of media devices (e.g., speakers, microphones, cameras, and the like) with computers is ubiquitous. Media devices often are connected to certain types of computers as peripheral devices, integrated within certain types of computers, and the like. Additionally, the use of media devices for remote media conferencing continues to increase in many environments (e.g., enterprise environments, health services environments, and the like). Thus, it is desirable to ensure that media devices are working properly before the media devices are scheduled to be used for remote media conferencing or other types of activities.

SUMMARY OF EMBODIMENTS

Various deficiencies in the prior art are addressed by embodiments for automated testing of media devices.

In at least some embodiments, a computer includes a processor and a memory communicatively connected to the processor, where the processor is configured to propagate, toward a camera associated with the computer, at least one instruction configured to cause the camera to capture a set of images, receive the set of images captured via the camera, and determine whether the camera is functioning properly based on processing of the set of images.

In at least some embodiments, a computer includes a processor and a memory communicatively connected to the processor, where the processor is configured to generate an audio signal, propagate the audio signal toward a speaker associated with the computer for playout via the speaker, monitor a signal received from a microphone associated with the computer for detection of the audio signal, and determine whether the speaker and the microphone are functioning properly based on a determination as to whether the signal received from a microphone includes the audio signal.

In at least some embodiments, a computer includes a processor and a memory communicatively connected to the processor, where the processor is configured to receive, at the computer from a management system, a test script configured to test a set of media devices associated with the computer, execute the test script for determining whether the set of media devices is functioning properly, and propagate, toward the management system, test results indicative as to whether the set of media devices is functioning properly.

BRIEF DESCRIPTION OF THE DRAWINGS

The teachings herein can be readily understood by considering the detailed description in conjunction with the accompanying drawings, in which.

To facilitate understanding, identical reference numerals have been used, where possible, to designate identical elements common to the figures.

DETAILED DESCRIPTION OF EMBODIMENTS

A device testing capability is presented herein. The device testing capability supports automated testing of media devices (e.g., cameras, microphones, speakers, or the like) for verifying that the media devices are functioning properly. The device testing capability may support automated verification by an endpoint that one or more media devices or one or more sets of media devices associated with endpoint are functioning properly. For example, the device testing capability may support automated verification by a computer that a camera associated with the computer is functioning properly, automated verification by a computer that a speaker and a microphone that are associated with the computer are functioning properly, or the like, as well as various combinations thereof. The device testing capability may support automated verification, by a management system, of the proper operation of media devices associated with endpoints in a set of endpoints, where the set of endpoints may include one or more (or even a large number) of endpoints. It will be appreciated that the set of endpoints may be endpoints of any suitable type of environment, such as a healthcare services environment (e.g., in which healthcare professionals may provide healthcare services remotely via communication networks), an enterprise environment (e.g., for a corporation in which the employees interact via multimedia conferences with each other, customers, suppliers, or the like), or the like. These and various other embodiments of the device testing capability may be better understood by way of reference to the exemplary communication system of FIG. 1.

Figure 1:
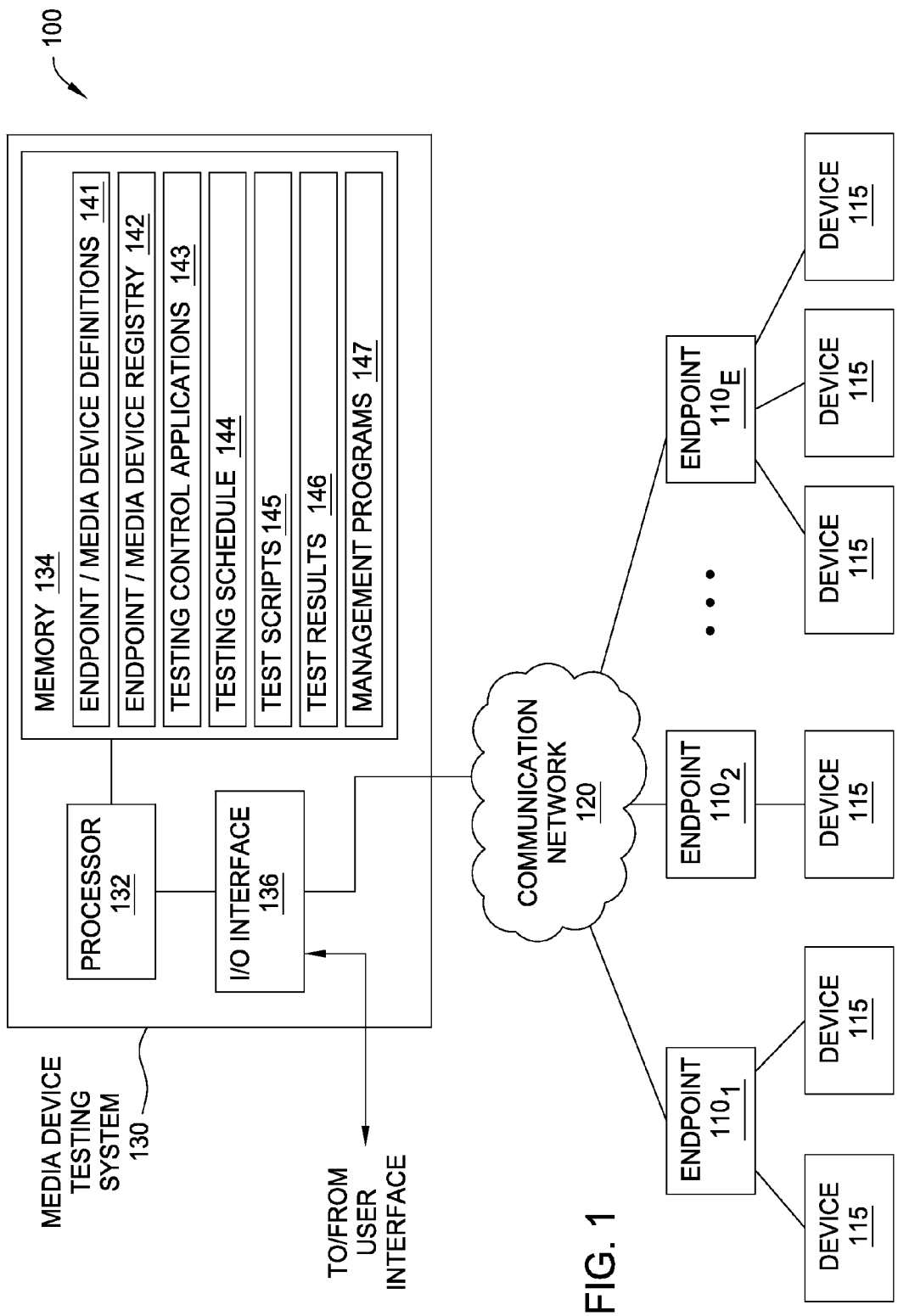
FIG. 1 depicts an exemplary communication system configured to support automated testing of media devices.

FIG. 1 depicts an exemplary communication system configured to support automated testing of media devices.

The communication system 100 of FIG. 1 includes a set of endpoints $110_1$-$110_E$ (collectively, endpoints 110), a communication network (CN) 120, and a media device testing system (MDTS) 130. The endpoints $110_1$-$110_E$ have respective sets of media devices $115_1$-$115_E$ (collectively, media devices 115) associated therewith, where each of the sets of media devices 115 may include one or more media devices 115. The endpoints 110 are communicatively connected to CN 120. The MDTS 130 is communicatively connected to the CN 120.

The endpoints 110 include devices configured to support the use of one or more media devices 115. For example, the endpoints 110 may include desktop computers, laptop computers, tablet computers, smartphones, set top boxes, or the like. Thus, endpoints 110 also may be referred to herein as computers or computing devices. The media devices 115 include devices configured to handle media content (e.g., to capture media content and provide the media content to the associated endpoint 110, to output media content received or generated at the associated endpoint 110, or the like). For example, the media devices 115 may include cameras, microphones, speakers, or the like. The media devices 115 may be communicatively connected to endpoints 110, directly connected to endpoints 110, integrated within endpoints 110, or the like. The communication of a media device 115 with an endpoint 110 may be via any suitable type of communication path (e.g., an RS-232 connection, a Universal Serial Bus (USB) connection, a Bluetooth connection, a WiFi connection, a cellular connection, an Internet Protocol (IP) connection, or the like). For example, where an endpoint 110 is a desktop computer, the media devices 115 may include a camera connected to the desktop computer via a USB connection, a microphone connected to the desktop computer via a USB connection, and a speaker connected to the desktop computer via a USB connection. For example, where an endpoint 110 is a tablet computer, the media devices 115 may include a camera, a microphone, and a speaker, each of which is integrated within the tablet computer. Accordingly, the connections between the media devices 115 and the endpoints 110 will be understood to represent any such communication paths (e.g., external communication paths where the media devices 115 are external to and communicatively connected to the associated endpoint 110, internal communication paths where the media devices 115 are integrated within the associated endpoint 110, or the like). The typical arrangement of, and communication between, endpoints 110 and media devices 115 will be understood by one skilled in the art.

The endpoints 110 are configured to perform tests to verify that media devices 115 associated with the endpoints 110 are functioning properly. An endpoint 110 may be configured to perform one or more tests configured to perform testing of one or more media devices 115 associated with the endpoint 110 (e.g., responsive to conditions detected locally by the endpoint 110, under the control of MDTS 130, or the like). An endpoint 110 may be configured to run an application configured to support testing of one or more media devices 115 associated with the endpoint 110 (e.g., where the application may be obtained from MDTS 130). An endpoint 110 may be configured to execute one or more test scripts configured to perform testing of one or more media devices 115 associated with the endpoint 110 (e.g., where the test scripts may be obtained from MDTS 130, executed based on a testing schedule determined or specified by MDTS 130, or the like). An endpoint 110 may be configured to aggregate test results of tests performed by the endpoint 110 for one or more media devices 115 associated with the endpoint 110. An endpoint 110 may be configured to report test results, of tests performed by the endpoint 110 for one or more media devices 115 associated with the endpoint 110, to MDTS 130. The operation of endpoints 110 and media devices 115 in supporting automated verification of the media devices 115 may be better understood by way of reference to method 200 of FIG. 2, as well as methods 300, 400, and 500 of FIGS. 3, 4, and 5, respectively.

The CN 120 includes any type of communication network(s) suitable for supporting communications between endpoints 110 and MDTS 130. For example, CN 120 may include wireline networks, wireless networks, or the like, as well as various combinations thereof. For example, CN 120 may include one or more wireline or wireless access networks, one or more wireless or wireless core networks, one or more private data networks, one or more public data networks, or the like. For example, CN 120 may be an Internet Protocol (IP)-based network.

The MDTS 130 is configured to control automated verification by endpoints 110 that media devices 115 associated with the endpoints 110 are functioning properly.

The MDTS 130 includes a processor 132, a memory 134, and an input/output (I/O) interface 136. The memory 134 and the I/O interface 136 are communicatively connected to processor 132. The processor 132 is configured to retrieve programs from memory 134 and execute the programs for providing various functions in support of automated verification by endpoints 110 that media devices 115 associated with the endpoints 110 are functioning properly. The processor 132 is configured to control storage and processing of various types of information (e.g., programs, scripts, data, or the like) which may be stored in memory 134, as discussed below. The I/O interface 136 supports an interface to CN 120 for supporting communications between MDTS 130 and endpoints 110. The I/O interface 136 also supports an interface to a user interface of the MDTS 130 (e.g., a Graphical User Interface (GUI) or other suitable type of interface) via which administrators may perform various functions in support of and related to automated verification by endpoints 110 that media devices 115 associated with the endpoints 110 are functioning properly. It will be appreciated that the MDTS 130 may be implemented in any other suitable manner.

The MDTS 130 may be configured to perform various functions in order to support automated verification by endpoints 110 that media devices 115 associated with the endpoints 110 are functioning properly.

The MDTS 130 may be configured to support definition of endpoints 110 and media devices 115 (depicted as endpoint/media device definitions 141 in memory 134). The definitions of endpoints 110 may include definitions of endpoint types for the endpoints 110 (e.g., based on endpoint type, endpoint manufacturer, endpoint model, capabilities supported by the endpoint, or the like) and, similarly, definitions of media devices 115 may include definitions of media device types for the media devices 115 (e.g., based on media content type, media device manufacturer, media device model, capabilities supported by the media device, or the like). The endpoint/media device definitions 141 may be used to control communications by the MDTS 130 with the endpoints 110, determine the types of media device validation tests to be performed, determine specific media device validation test scripts to be used to test the media devices 115, determine the basis for initiating media device validation tests (e.g., frequency, trigger condition, and so forth), or the like, as well as various combinations thereof. The endpoint/media device definitions 141 may be entered into MDTS 130 manually via a user interface of MDTS 130, generated automatically based on information received from endpoints 110 or one or associated management systems, or the like.

The MDTS 130 may be configured to support registration of endpoints 110 and media devices 115 associated with endpoints 110, which results in storage of endpoint information for the endpoints 110 and media device information for the media devices 115 (depicted as endpoint/media device registry 142 in memory 134). The endpoints 110 may register themselves or their associated media devices 115 with MDTS 130 at any time. The registration of an endpoint 110 and associated media devices 115 with MDTS 130 may include the endpoint 110 providing endpoint information associated with the endpoint and media device information associated with its associated media devices 115 to MDTS 130 for processing and storage by MDTS 130 (e.g., as endpoint/media device registration information stored in endpoint/media device registry 142). The endpoint information for an endpoint 110 may include one or more of an identifier of the endpoint 110, a device type of the endpoint 110, a manufacturer and model of the endpoint 110, one or more addresses of the endpoint 110 (e.g., IP address, MAC address, or the like), one or more characteristics or capabilities of the endpoint 110, or the like. The media device information for a media device 115 may include one or more of an identifier of the media device 115, a device type of the media device 115, a manufacturer and model of the media device 115, one or more characteristics or capabilities of the media device 115, or the like.

The MDTS 130 may be configured to provide testing control applications for use by endpoints 110 in controlling automated testing of media devices 115 by endpoints 110 (depicted as testing control applications 143 in memory 134). The testing control applications 143 may be provided to endpoints 110 in any other suitable manner (e.g., downloaded by endpoints 110, pushed to endpoints 110, or the like). The testing control application 143 used by an endpoint 110 may be configured to enable the endpoint 110 to communicate with the MDTS 130 (e.g., receive testing schedules, obtain test scripts, report test results, or the like), process testing schedules according to which media devices 115 are to be tested, execute test scripts for testing media devices 115, aggregate test results associated with testing of media devices 115, or the like, as well as various combinations thereof. The testing control applications 143 may support communications with MDTS 130 via various communication protocols and capabilities (e.g., WebSockets, Hypertext Transfer Protocol (HTTP), or the like). The testing control applications 143 may include different application versions for different endpoints 110 (e.g., based on the endpoint types of endpoints 110, based on the operating systems (OSs) of endpoints 110, or the like). In at least some embodiments, a testing control application 143 is configured to include a reader function configured to receive information from MDTS 130 (e.g., receiving testing schedules via WebSockets, receiving test scripts via HTTP, or the like), a test scheduler function configured to schedule testing of media devices 115 associated with the endpoint 110 on which the testing control application 143 is running (e.g., receiving and processing testing schedules from the reader function), a test controller function configured to control testing of media devices 115 associated with the endpoint 110 on which the testing control application 143 is running (e.g., initiating tests of media device 115 based on testing schedules or testing instructions received from the test scheduler function), a writer function configured to send information to MDTS 130 (e.g., sending test results via WebSockets), and, optionally, a user interface function configured to control presentation of testing information (e.g., testing schedules, test scripts, test results, or the like) via one or more user interfaces of the endpoint 110 on which the testing control application 143 is running. It will be appreciated that one or more of the testing control applications 143 may be implemented in any other suitable manner.

The MDTS 130 may be configured to provide testing schedules adapted to coordinate automated testing of media devices 115 by endpoints 110 (depicted as testing schedules 144 in memory 134).

The MDTS 130 may be configured to maintain testing schedules 144 for use by the endpoints 110 in testing associated media devices 115. The testing schedules 144 may be specified at any suitable granularity (e.g., for all endpoints 110, for groups of endpoints 110, for individual endpoints 110, based on endpoint types of endpoints 110, for all media devices 115, for groups of media devices 115, for individual media devices 115, based on media device types of media devices 115, or the like, as well as various combinations thereof). The testing schedules 144 may schedule tests of media devices 115 periodically (e.g., once each day, once each week, or the like), responsive to trigger conditions (e.g., an indication that the media devices 115 are scheduled to be used within a threshold length of time, an indication that the media devices 115 are predicted to be used in the near future, or the like), or the like, as well as various combinations thereof. The testing schedules 144 may take into account scheduled uses of the media devices 115 (e.g., scheduling testing in advance of a scheduled doctor appointment in a healthcare environment, scheduling testing in advance of a scheduled multimedia conference in an enterprise environment, or the like), statuses of the media devices 115 (e.g., not testing media devices 115 while they are in use), statuses of the endpoints 110 (e.g., not testing media devices 115 associated with endpoints 110 that are in use), communication network statuses for communication networks supporting communications with the endpoints 110 (e.g., not testing when the communication network is overloaded, such as where a large number of other endpoints 110 are testing media devices 115 under the control of MDTS 130), the status of MDTS 130 (e.g., not testing when MDTS 130 is overloaded or at times that MDTS 130 is expected to be overloaded), or the like, as well as various combinations thereof.

The MDTS 130 may be configured to provide testing schedules 144 to endpoints 110 for use by endpoints 110 in performing automated testing of associated media devices 115 (e.g., each endpoint 110 receives all testing schedules 144, each endpoint 110 only receives a testing schedule(s) 144 relevant to that endpoint 110, or the like). The testing schedule 144 for an endpoint 110 (or portion of the testing schedule 144 relevant to an endpoint 110) provides a schedule according to which the endpoint 110 is to perform testing media devices 115 associated with the endpoint 110. The testing schedule for the endpoint 110 (or portion of the testing schedule 144 relevant to an endpoint 110) may specify which media devices 115 that are associated with the endpoint 110 are to be tested, times at which the media devices 115 are to be tested, specific tests (e.g., test scripts, as discussed below) to be used for testing the media devices 115 to be tested, or the like, as well as various combinations thereof. It will be appreciated that the testing schedule 144 for the endpoint 110 (or portion of the testing schedule 144 relevant to the endpoint 110) may indicate testing of some or all of the media devices 115 associated with the endpoint 110, that different media devices 115 associated with the endpoint 110 may be tested under different conditions (e.g., at different times, responsive to different trigger conditions, or the like), or the like, as well as various combinations thereof.

The MDTS 130 may be configured to provide test scripts for use by endpoints 110 in testing media devices 115 to verify that the media devices 115 are functioning properly (depicted as test scripts 145 in memory 134). The test scripts 145 may be configured to perform testing of media devices 115 by sending information (e.g., commands, content, or the like) to media devices 115 and receiving information (e.g., captured content or the like) from media devices 115. The test scripts 145 may be specified for different types of media devices 115 (e.g., one or more test scripts 145 configured to determine whether cameras are functioning properly, one or more test scripts 145 configured to determine whether a microphone and speaker combination are functioning properly, or the like). The test scripts 145 may be defined based on endpoint definitions of endpoints 110 (e.g., different test scripts for testing media devices 115 associated with different endpoint types, such as where different test scripts are provided for endpoints 110 using different OSs, different testing control applications 143, or the like), media device definitions of media devices 115 (e.g., different test scripts for testing different types of cameras, different test scripts for testing different types of microphones, different test scripts for speakers using different device drivers, or the like), or the like, as well as various combinations thereof. The test scripts 145 may be configured to run on endpoints 110 under the supervision of testing control applications 143 running on the endpoints 110. The test scripts 145 may be configured to run in native OS shells (e.g., cmd, powershell, bash, csh, or the like).

The MDTS 130 may be configured to maintain test results based on tests performed by endpoints 110 to verify that media devices 115 associated with the endpoints 110 are functioning properly (depicted as test results 146 in memory 134). The MDTS 130 is configured to receive test results 146 from endpoints 110 based on execution of test scripts 145 by endpoints 110 for testing media devices 115 associated with endpoints 115. The test results 145 for a given test of a given set of media devices 115 by a given endpoint 110 may include information describing the test and associated results of the test (e.g., a test name of the test, an identifier of an endpoint 110 associated with the set of media devices 115 tested, one or more identifiers of the one or more media devices 115 tested, a start time of the test, a duration of the test, an indication for each of the media devices 115 as to whether the media device 115 is functioning properly or not functioning properly, details of the execution of the test script(s) 145 executed by the endpoint 110 to test the media devices 115, an indication as to whether any notifications are to be issued based on the testing of the media devices 115, or the like, as well as various combinations thereof). The MDTS 130 is configured to store the test results in memory 134. The MDTS 130 may be configured to process test results received from endpoints 110 (e.g., aggregating test results for a given media device 115, aggregating test results for a given set of media devices 115, aggregating test results for media devices 115 of a particular media device type or media device definition, aggregating test results for a given endpoint 110, aggregating test results for a given set of endpoints 110, aggregating test results for endpoints 110 of a particular endpoint type or endpoint definition, aggregating test results based on the testing schedule 144 used to control testing which produced the test results, or the like, as well as various combinations thereof).

The MDTS 130 may be configured to support management functions which may be performed based on test results 146 (depicted as management programs 147 in memory 134). The management programs 147 may include test result analysis programs for analyzing test results 146, test result presentation programs for controlling presentation of test results 146 via the user interface of MDTS 130, notification programs for initiating notifications based on test results 146 (e.g., notifications of successful tests of media devices 115, notifications of failed tests of media devices 115, notifications of potential problems with endpoints 110 or media devices 115, reporting of endpoints 110 or endpoint types with a history of malfunctioning (e.g., a certain percentage of tests performed for media devices 115 of an endpoint type fail), reporting of media devices 115 or media device types with a history of malfunctioning (e.g., a certain percentage of tests performed for media devices 115 of a media device type fail), or the like), reliability forecasting programs for forecasting reliability of endpoints 110 or media devices 115, or the like, as well as various combinations thereof. In at least some embodiments, test result analysis programs may be configured to analyze test results 146 for patterns (e.g., based on endpoint types, endpoint definitions, media device types, media device definitions, or the like), analyze test results 146 to determine whether additional tests need to be initiated or scheduled, analyze test results 146 to determine whether modifications to testing schedules 144 or test scripts 145 are necessary or desirable, or the like, as well as various combinations thereof. In at least some embodiments, notification programs may be configured to initiate notifications based on test results 146, such as where notification of a problem or potential problem with one or more media devices 115 associated with an endpoint 110 may be initiated (e.g., propagated for presentation via the user interface of MDTS 130, propagated to an owner or operator of the endpoint 110, propagated to one or more participants in a media conference that will utilize the endpoint 110 (e.g., the doctor and patient in a healthcare environment, each scheduled participant of a multimedia conference in an enterprise environment, or the like), or the like).

Figure 2:
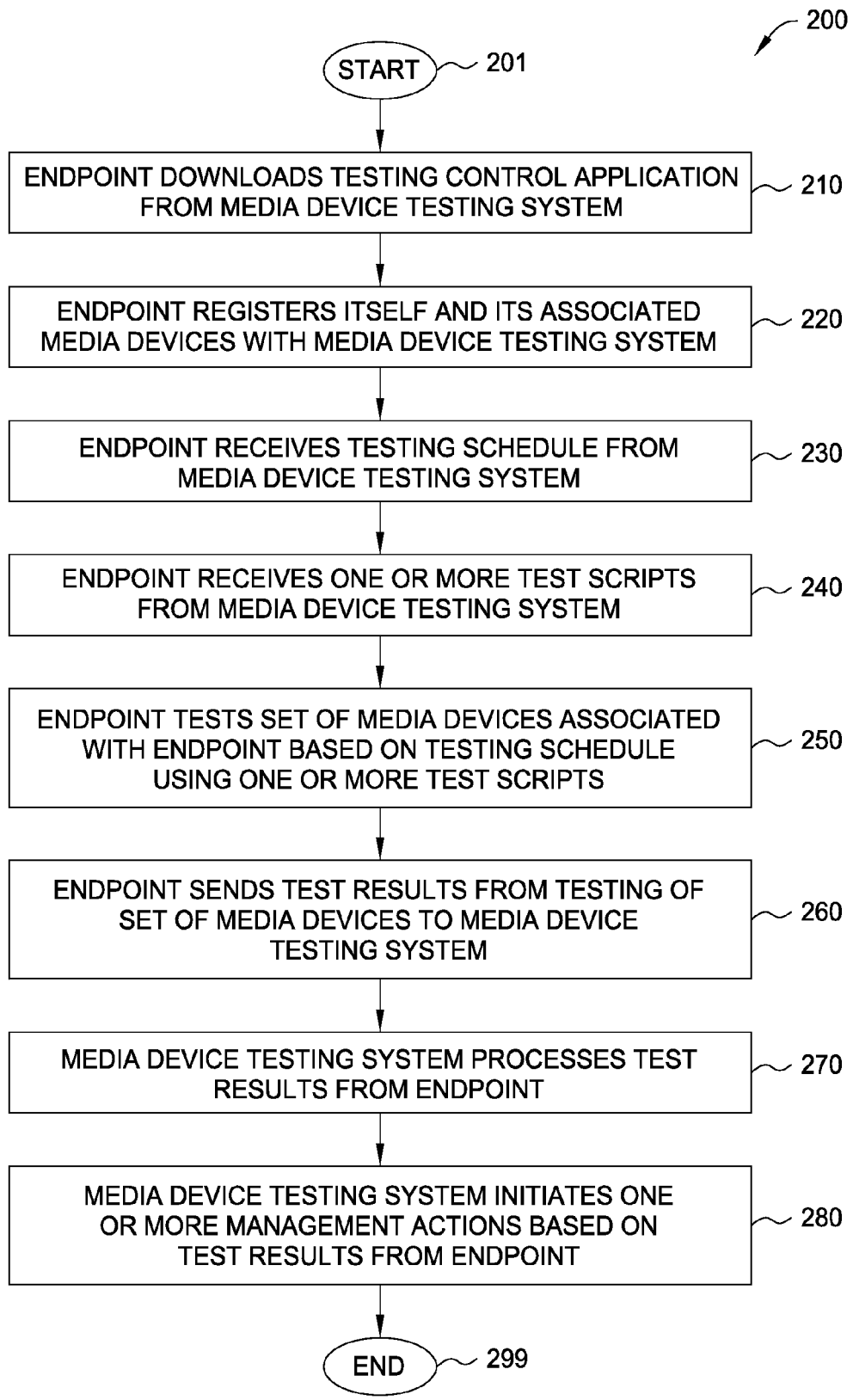
FIG. 2 depicts an embodiment of a method for managing the testing of media devices associated with one of the endpoints of the communication system of FIG. 1.

The operation of MDTS 130 in providing these and other functions may be better understood by way of reference to method 200 of FIG. 2.

The communication system 100 may support automated testing of media devices within various types of environments.

For example, communication system 100 may support automated testing of media devices within a healthcare environment configured to enable healthcare professionals to provide healthcare services remotely. For example, the endpoints 110 may include endpoints located in healthcare service provider locations (e.g., located in doctor offices and hospitals in order to enable healthcare professionals to have multimedia conferences with patients at other locations, to confer with other healthcare professionals at other locations via multimedia conferences, or the like), endpoints located at patient locations (e.g., to enable healthcare professions at remote locations to speak with and even see patients so as to examine patients at remote patient locations), or the like.

For example, communication system 100 may support automated testing of media devices within a multimedia conferencing environment of an enterprise. For example, the endpoints 110 may include one or more of endpoints at enterprise locations (e.g., computers at offices of employees of the enterprise), endpoints at customer locations (e.g., computers at offices of customers of the enterprise), endpoints at supplier locations (e.g., computers at offices of suppliers of the enterprise), or the like.

It will be appreciated that communication system 100 may support automated testing of media devices within other types of environments.

FIG. 2 depicts an embodiment of a method for managing the testing of media devices associated with one of the endpoints of the communication system of FIG. 1. It will be appreciated that portions of the steps of method 200 may be performed by MDTS 130 and portions of the steps of method 200 may be performed by one of the endpoints 110. It also will be appreciated that, although primarily depicted and described herein as being performed serially, at least a portion of the steps of method 200 may be performed contemporaneously or in a different order than depicted in FIG. 2.

At step 201, method 200 begins.

At step 210, the endpoint 110 downloads a testing control application 143 from MDTS 130.

At step 220, the endpoint 110 registers itself, and its associated media devices 115, with MDTS 130. The endpoint 110 may register itself, and its associated media devices 115, with MDTS 130 using testing control application 143. The endpoint information for endpoint 110 may include a unique identifier for the endpoint 110, manufacturer and model information of the endpoint 110, one or more characteristics or capabilities supported by the endpoint 110, or the like. The media device information a media device 115 associated with the endpoint 110 may include a unique identifier for the media device 115, manufacturer and model information of the media device 115, one or more characteristics or capabilities supported by the media device 115, or the like. In at least some embodiments, registration of the endpoint 110 may include automated discovery of the media devices 115 associated with the endpoint 110. It is noted that at least a portion of the endpoint information or the media device information may be determined from the endpoint/media device definitions 141. The endpoint information for endpoint 110, and the media device information for media devices 115 associated with endpoint 110, may be stored in endpoint/media device registry 142.

At step 230, the endpoint 110 receives a testing schedule 144 from MDTS 130. The testing schedule 144 may be specific to endpoint 110 or may include testing schedule information for multiple endpoints 110 (in which case the endpoint 110 needs to parse the testing schedule 144 to determine any testing to be performed by the endpoint 110). The endpoint 110 may receive the testing schedule 144 from MDTS 130 automatically (e.g., MDTS 130 provides the testing schedule 144 to the endpoint 110), request the testing schedule 144 from MDTS 130, or the like. The testing schedule 144 may include information indicative as to which media devices 115 of the endpoint 110 are to be tests, which tests are to be performed, scheduled times at which the tests are to be performed, information to be provided as part of the test results of the tests, or the like, as well as various combinations thereof.

At step 240, the endpoint 110 receives one or more test scripts 145 from MDTS 130. The endpoint 110 may receive the one or more test scripts 145 from MDTS 130 automatically (e.g., MDTS 130 determines the one or more test scripts 145 for the endpoint 110 based on the testing schedule 144 and sends the one or more test scripts 145 to the endpoint 110), by requesting the one or more test scripts 145 from MDTS 130 (e.g., based on the testing schedule 144), or the like.

At step 250, the endpoint 110 tests a set of media devices 115 associated with the endpoint 110 based on the testing schedule 144 using the one or more test scripts 145. The set of media devices 115 may include some or all of the media devices 115 associated with the endpoint 110. The execution of a test script 145 by the endpoint 110 may test one or more media devices 115 associated with the endpoint 110 (e.g., a camera, a combination of a microphone and a speaker, or the like).

The testing of a media device 115 to determine whether the media device 115 is functioning properly may include one or more of evaluating the device status of the media device 115, evaluating the content handling capability of the media device 115, or the like. The media device 115 may be determined to be functioning properly based on successful validation of each of the characteristics of the media device 115 for which evaluation of the characteristic is performed, otherwise the media device 115 is determined not to be functioning properly. For example, where only the device status of the media device 115 is evaluated, the media device 115 may be determined to be functioning properly based on successful validation of the device status of the media device 115. Similarly, for example, where the device status of the media device 115 is evaluated and the content handling capability of the media device 115 is evaluated, the media device 115 may be determined to be functioning properly based on successful validation of the device status of the media device 115 and successful validation of the content handling capability of the media device 115. In at least some embodiments, the evaluation of the content handling capabilities of the media device 115 is only performed following verification of the device status of the media device 115.

The evaluation of device status of a media device 115 may include determining whether the media device 115 has power, determining whether a device driver for the media device 115 is correct and functioning properly, or the like. The device status of the media device 115 may be determined by requesting the device status of the media device 115 from the OS of the endpoint 110 with which the media device is associated. The device status of the media device 115 may be determined from any other suitable source of such information.

The evaluation of the content handling capability of a media device 115 depends on the device type of the media device 115. For example, testing of a camera to validate that the camera is functioning properly may be based on a determination as to whether or not the camera is capturing images properly (e.g., execution of a test script 145 for testing a content handling capability of a camera may be performed as depicted and described with respect to FIG. 3). For example, testing of a combination of a microphone and a speaker to validate that the microphone and speaker are functioning properly may be based on a determination as to whether or not the speaker is outputting audio properly and a determination as to whether the microphone is capturing audio properly (e.g., execution of a test script 145 for testing a combination of a microphone and a speaker may be performed as depicted and described with respect to FIG. 4).

The execution of a test script 145 by the endpoint 110 for testing one or more media devices 115 associated with the endpoint 110 results in generation of test results 146.

At step 260, the endpoint 110 sends test results 146, from the testing of the set of media devices 115 associated with the endpoint 110, to MDTS 130. The endpoint 110 may report the test results 146 for each media device 115 or combination of media devices 115 for which an associated test script 145 was executed by the endpoint, for the set of media devices 115 tested by the endpoint 110 (e.g., based on aggregation of test results at the endpoint 110), or the like. The endpoint 110 may report the test results in any suitable format.

At step 270, MDTS 130 processes the test results 146 from the testing of the set of media devices 115 associated with the endpoint 110. The processing of the test results 146 may include aggregating the test results 146 with other test results 146, analyzing the test results to determine one or more management actions to initiate based on the test results 146, or the like, as well as various combinations thereof.

At step 280, MDTS 130 initiates one or more management actions based on the test results 146 from the testing of the set of media devices 115 associated with the endpoint 110. The one or more management actions may include presenting the test results 146 via the user interface of MDTS 130, initiating one or more notifications related to the endpoint 110 based on the test results 146, initiating or scheduling one or more additional tests for testing of one or more of the media devices 115 associated with the endpoint 110, or the like, as well as various combinations thereof.

At step 299, method 200 ends.

It will be appreciated that, although primarily depicted and described within the context of performing testing of media devices 115 of a single endpoint 110, method 200 may be executed by MDTS 1130 and endpoints 110 for performing testing of media devices 115 of any suitable number of endpoints 110 (e.g., MDTS 130 executes the described functions for each of the endpoints 110 and each of the endpoints 110 executes functions for performing the testing of the media devices 115 associated with endpoints, respectively).

Figure 3:
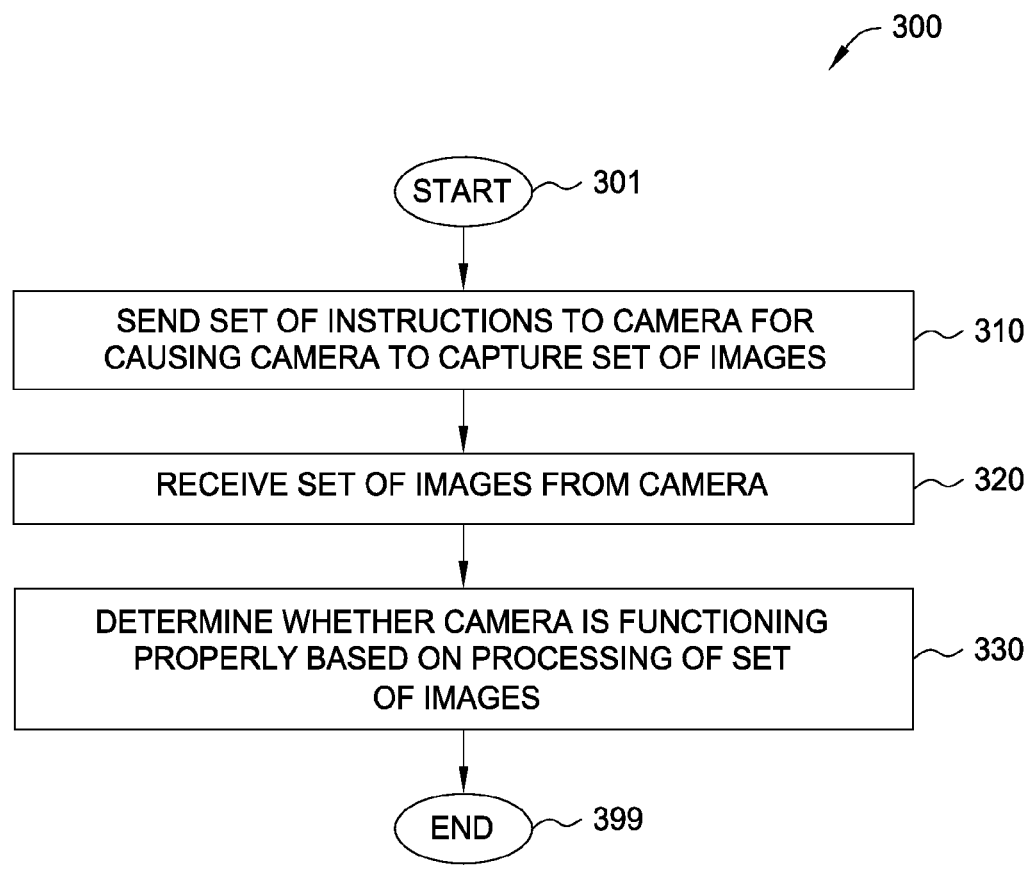
FIG. 3 depicts an embodiment of a method for use by an endpoint in validating that a camera associated with the endpoint is functioning properly.

FIG. 3 depicts an embodiment of a method for use by an endpoint in validating that a camera associated with the endpoint is functioning properly. It will be appreciated that, although primarily depicted and described as being performed serially, at least a portion of the steps of method 300 of FIG. 3 may be performed contemporaneously or in a different order than depicted in FIG. 3. It will be appreciated that, although omitted for purposes of clarity, method 300 also may include steps for evaluating the device status of the camera (which, as discussed above, may be a prerequisite to execution of the steps depicted in FIG. 3).

At step 301, method 300 begins.

At step 310, a set of instructions is sent to the camera. The set of instructions is configured to cause the camera to capture a set of images. At step 320, a set of images is received from the camera. The set of images may include one or more images captured by the camera. At step 330, a determination is made as to whether the camera is functioning properly based on processing of the set of images.

In at least some embodiments, the determination as to whether the camera is functioning properly based on processing of the set of images may include a determination as to whether the set of images includes content indicative that the camera is functioning properly.

In at least some embodiments, method 300 may include instructing the camera to capture an image, receiving the image captured by the camera, and processing the image for determining whether the image includes a signal. The determination as to whether the image includes a signal may include determining an average intensity in the image and determining whether the average intensity satisfied a threshold. The determination as to whether the image includes a signal may include determining a set of local intensities for a set of regions of the image (e.g., an average local intensity for each region of the image, a peak local intensity for each region of the image, or the like), and determining whether the image includes a signal based on the set of local intensities (e.g., a threshold number of regions have a local intensity value satisfying a threshold). It will be appreciated that various combinations of such image intensity values, and associated image intensity thresholds, may be used to determine whether the image includes a signal. If the image is determined to include a signal (or a signal of sufficient intensity, a signal of sufficient intensity in a sufficient number of locations, or the like), a determination may be made that the camera is functioning properly. If the image is determined not to include a signal (or not to include a signal of sufficient intensity, a signal of sufficient intensity in a sufficient number of locations, or the like), a determination may be made that the camera is not functioning properly.

In at least some embodiments, method 300 may include instructing the camera to capture a first image according to a first camera configuration (e.g., the existing camera configuration or a camera configuration provided to the camera prior to capturing of the first image), receiving the first image captured by the camera, instructing the camera to capture an image according to a second camera configuration that is different than the first camera configuration (e.g., based on adjustment of one or more of a pan, tilt, zoom, or other capability of the camera), receiving the second image captured by the camera, and processing the first and second images to determine whether the camera is functioning properly. The processing of the first and second images to determine whether the camera is functioning properly may include determining whether the content of the first image and the second image is different, determining whether a threshold percentage of the content of the first image and the second image is different, or the like. If the content of the first and second images is different or sufficiently different, a determination may be made that the camera is functioning properly. If the content of the first and second images is not different or not sufficiently different, a determination may be made that the camera is not functioning properly. It is noted that where the first and second images captured by the camera are identical, this may be considered a successful or unsuccessful validation of the proper functioning of the camera (e.g., if use of pan, tilt, and zoom functions is not required or can be performed manually, then this might be considered a successful result since the camera is capturing video content; alternatively, if use of pan, tilt, and zoom functions is required and cannot be performed manually, then this might be considered an unsuccessful result since, even though the camera is capturing video content, the video content that is captured may not be sufficient for the purposes for which the camera is to be used).

In at least some embodiments, the determination as to whether the camera is functioning properly includes configuring or instructing a light source near the camera to output a pulse of light, instructing the camera to capture one or more images contemporaneous with the outputting of the pulse of light, and processing the one or more images captured by the camera to determine whether the one or more images include the pulse of light. The pulse of light may have a specific frequency and the processing of the image may include processing the image to detect a peak at the specific frequency. It will be appreciated that, although primary described with respect to use of a single pulse of light, the light source may be configured to output any suitable number of pulses of light (e.g., a light source that pulses a light at a fixed rate over a fixed period of time). The light source may be any suitable source of a light pulse(s), such as a light emitting diode (LED), a laser, or the like.

At step 399, method 300 ends.

Figure 4:
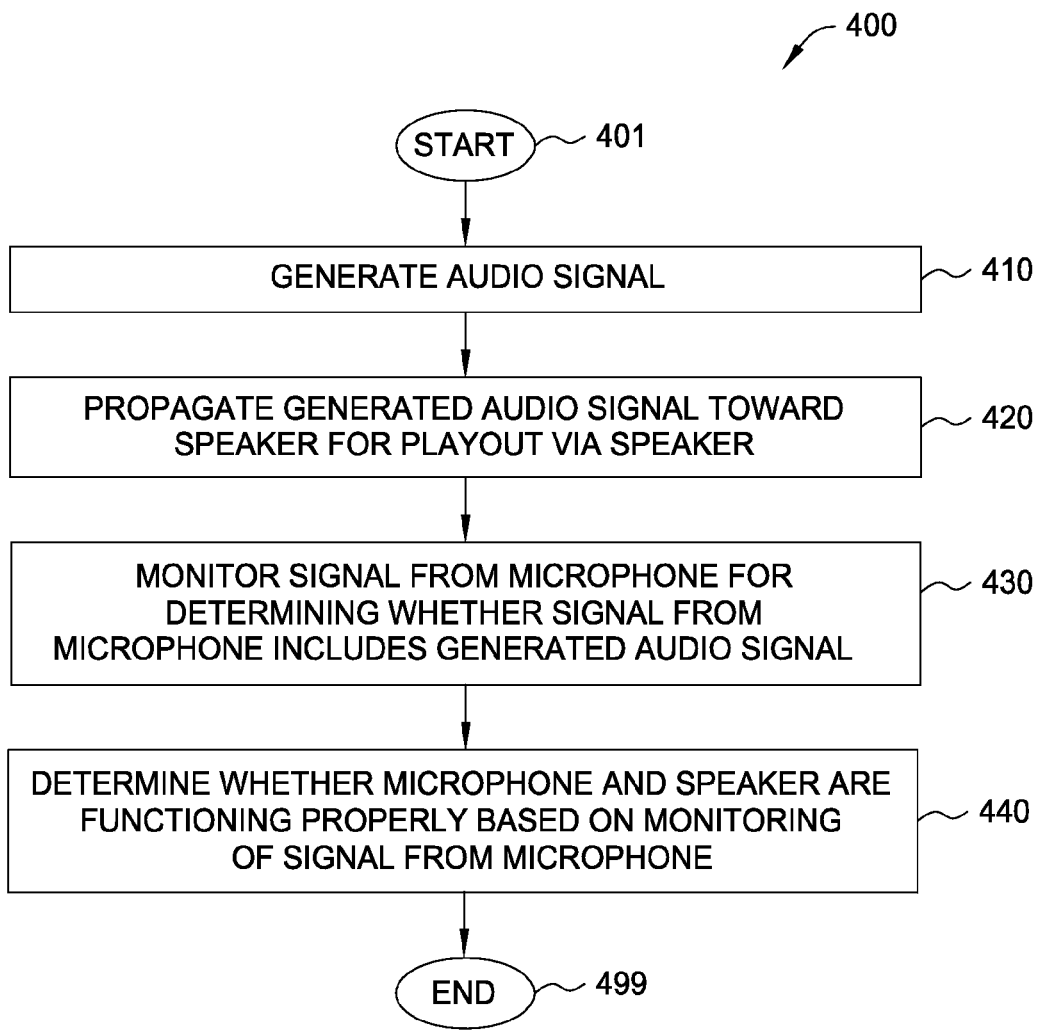
FIG. 4 depicts an embodiment of a method for use by an endpoint in validating that a microphone and a speaker associated with the endpoint are functioning properly.

FIG. 4 depicts an embodiment of a method for use by an endpoint in validating that a microphone and a speaker associated with the endpoint are functioning properly. It will be appreciated that, although primarily depicted and described as being performed serially, at least a portion of the steps of method 400 of FIG. 4 may be performed contemporaneously or in a different order than depicted in FIG. 4. It will be appreciated that, although omitted for purposes of clarity, method 400 also may include steps for evaluating the device statuses of the microphone and the speaker, respectively (which, as discussed above, may be a prerequisite to execution of the steps depicted in FIG. 4).

At step 401, method 400 begins.

At step 410, an audio signal is generated. The audio signal may be a monotone signal generated at a specific frequency.

At step 420, the audio signal is propagated toward a speaker for playout via the speaker.

At step 430, a signal from a microphone is monitored for determining whether the signal from the microphone includes the audio signal propagated toward the speaker.

At step 440, a determination is made, based on monitoring of the signal from the microphone, as to whether the microphone and the speaker are functioning properly. If the generated audio signal is detected within the signal from the microphone, a determination is made that the microphone and the speaker are both functioning properly. If the generated audio signal is not detected within the signal from the microphone, a determination is made that at least one of the microphone or the speaker is not functioning properly.

At step 499, method 400 ends.

Referring again to FIG. 1, it will be appreciated that, although primarily depicted and described with respect to embodiments in which an endpoint 110 validates one or more media devices 115 associated with the endpoint 110, in at least some embodiments a set of endpoints 110 may cooperate to validate one or more media devices 115 associated with one of the endpoints 110 in the set of endpoints 110. In at least some embodiments, a first endpoint 110 may control validation of a microphone and a speaker associated with the second endpoint 110. For example, endpoint $110_2$ may control testing of a microphone and speaker associated with endpoint $110_1$. The first endpoint 110 may control validation of a microphone and a speaker associated with the second endpoint 110 based on a test script provided to the first endpoint 110 (e.g., by MDTS 130) and a test script provided to the second endpoint 110 (e.g., by MDTS 130 or by the first endpoint). An exemplary embodiment in which a first endpoint 110 controls validation of a microphone and a speaker associated with a second endpoint 110 is depicted and described with respect to FIG. 5.

Figure 5:
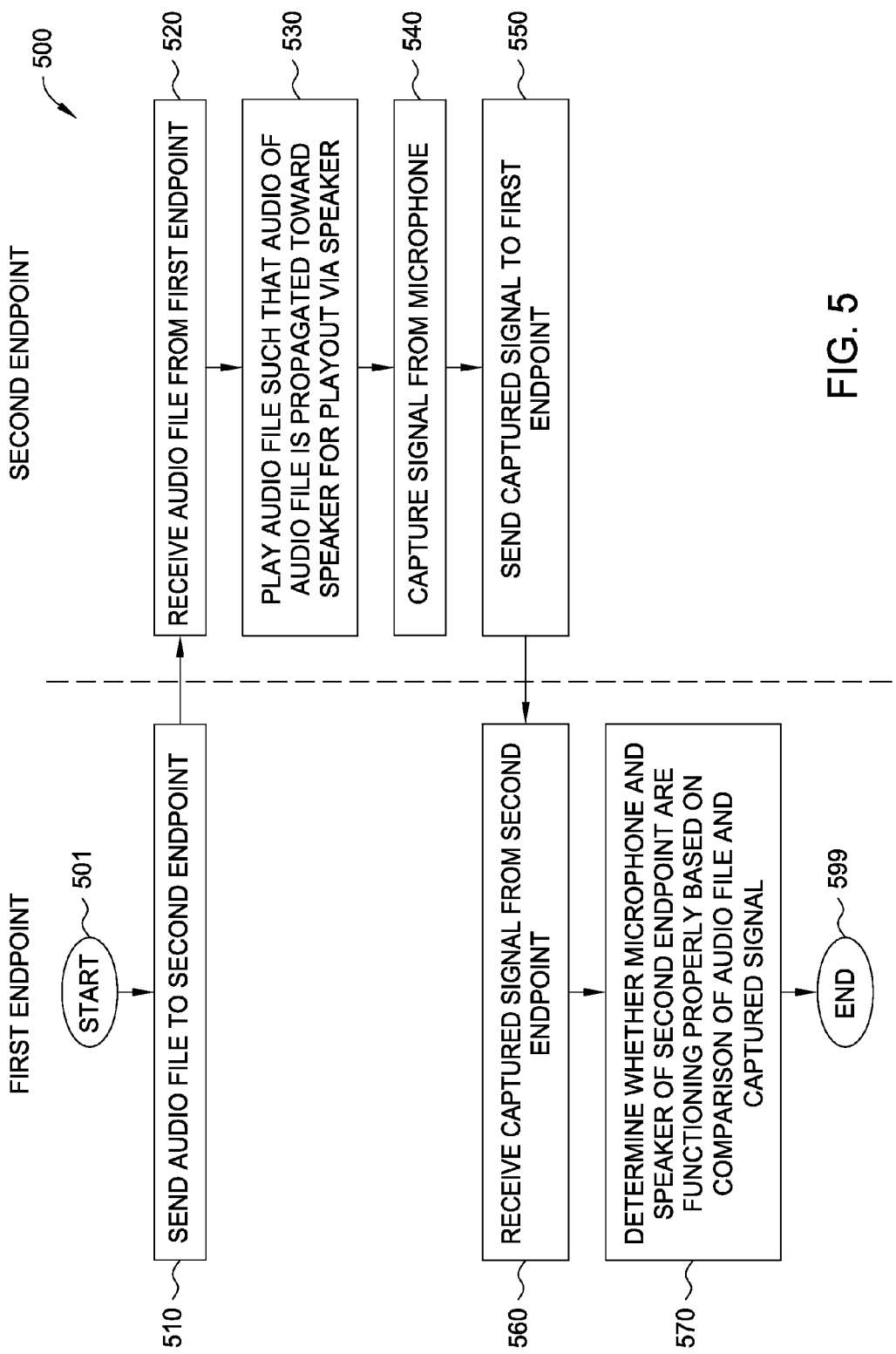
FIG. 5 depicts an embodiment of a method in which a first endpoint controls validation that a microphone and a speaker associated with a second endpoint are functioning properly.

FIG. 5 depicts an embodiment of a method in which a first endpoint controls validation that a microphone and a speaker associated with a second endpoint are functioning properly. As depicted in FIG. 5, a portion of the steps are executed by the first endpoint and a portion of the steps are executed by the second endpoint. It will be appreciated that, although primarily depicted and described as being performed serially, at least a portion of the steps of method 500 may be performed contemporaneously or in a different order than depicted in FIG. 5. It will be appreciated that, although omitted for purposes of clarity, method 500 also may include steps for evaluating the device statuses of the microphone and the speaker, respectively (which, as discussed above, may be a prerequisite to execution of at least a portion of the steps depicted in FIG. 5).

At step 501, method 500 begins.

At step 510, the first endpoint sends an audio file to the second endpoint. The audio file may be provided to the first endpoint in conjunction with a test script used by the first endpoint to execute its respective steps of method 500, retrieved by the first endpoint from a remote source of a suitable audio file, generated by the first endpoint, or the like).

At step 520, the second endpoint receives the audio file from the first endpoint.

At step 530, the second endpoint plays the audio file such that the audio of the audio file is propagated toward the speaker associated with the second endpoint for playout via the speaker associated with the second endpoint.

At step 540, the second endpoint captures a signal from the microphone associated with the second endpoint. It is noted that the signal may or may not include audio content depending on whether or not the microphone is functioning properly.

At step 550, the second endpoint sends the captured signal to the first endpoint. The second endpoint may send the captured signal to the first endpoint as a file, as streaming content, or the like.

At step 560, the first endpoint receives the captured signal from the second endpoint.

At step 570, the first endpoint compares the captured signal and the audio file in order to determine whether the microphone and speaker associated with the second endpoint are functioning properly. The first endpoint compares the captured signal and the audio file to determine whether the audio of the audio file is included within the captured signal received from the second endpoint. It is noted that, since this test requires transmission of the audio file via a communication path from the first endpoint to the second endpoint and transmission of the captured signal via a communication path from the second endpoint to the first endpoint, a determination that the captured signal does not include the audio of the audio file may not necessarily indicate that the microphone or speaker associated with the second endpoint are not functioning properly. If a determination is made that the audio of the audio file is included within the captured signal received from the second endpoint, this results in a determination that the microphone and speaker associated with the second endpoint are functioning properly (and, also, that communication paths between the first endpoint and the second endpoint are functioning properly, or at least sufficiently enough to support propagation of the audio content used in the test). If a determination is made that the audio of the audio file is not included within the captured signal received from the second endpoint, this results in a determination that the microphone and speaker associated with the second endpoint may not be functioning properly (again, as noted above, the microphone and speaker associated with the second endpoint may be functioning properly, but the test may have failed due to a problem with one or more communication paths between the first endpoint and the second endpoint).

At step 599, method 500 ends.

It will be appreciated that, although primarily depicted and described within the context of embodiments of the device testing capability in which testing of media devices is performed for a set of endpoints in a specific type of environment, various embodiments of the device testing capability also may support testing of media devices for sets of endpoints in various other types of environments.

It will be appreciated that, although primarily depicted and described within the context of embodiments of the device testing capability in which testing of media devices of an endpoint is controlled by a remote device (e.g., by a management system or other device communicating with the endpoint via a communication network), various embodiments of the device testing capability may be adapted such that the testing of media devices of an endpoint may be controlled locally by the endpoint (e.g., the endpoint may be configured to schedule testing of media devices, process test results from testing of media devices, generate and present notifications when media devices are determined not to be functioning properly, or the like). In at least some embodiments, the test script(s) used by the endpoint for controlling testing of media devices of the endpoint locally may be pre-installed on the endpoint, installed onto the endpoint, downloaded to the endpoint (e.g., as part of a media device validation service), or the like.

It will be appreciated that, although primarily depicted and described within the context of embodiments of the device testing capability in which media devices are tested, various embodiments of the device testing capability may be adapted for testing other types of devices which may be communicatively connected to or integrated within computers and other similar endpoint devices (e.g., computer displays, printers, telephones, or the like).

It will be appreciated that, although primarily depicted and described within the context of embodiments of the device testing capability in which devices are tested (e.g., media devices or other types of devices), various embodiments of the device testing capability may be adapted for testing other resources associated with devices (e.g., resources of endpoints with which devices are associated, communication paths between endpoints with which devices are associated, or the like, as well as various combinations thereof).

Figure 6:
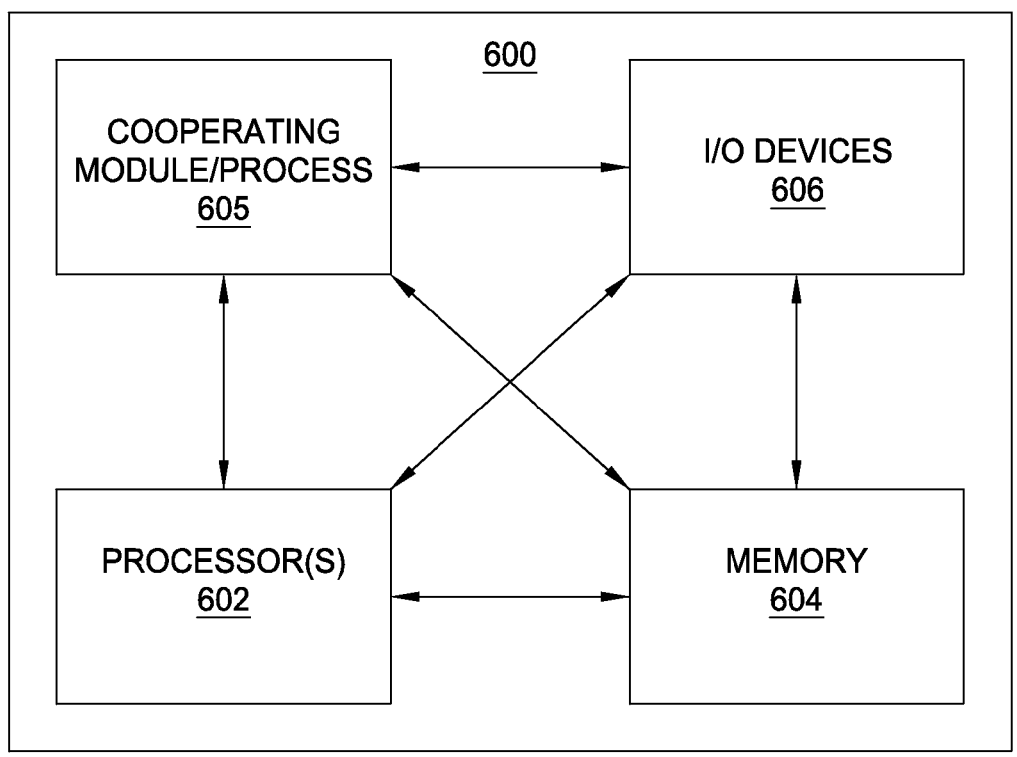
FIG. 6 depicts a high-level block diagram of a computer suitable for use in performing functions presented herein.

FIG. 6 depicts a high-level block diagram of a computer suitable for use in performing functions described herein.

The computer 600 includes a processor 602 (e.g., a central processing unit (CPU) and/or other suitable processor(s)) and a memory 604 (e.g., random access memory (RAM), read only memory (ROM), and the like).

The computer 600 also may include a cooperating module/process 605. The cooperating process 605 can be loaded into memory 604 and executed by the processor 602 to implement functions as discussed herein and, thus, cooperating process 605 (including associated data structures) can be stored on a computer readable storage medium, e.g., RAM memory, magnetic or optical drive or diskette, and the like.

The computer 600 also may include one or more input/output devices 606 (e.g., a user input device (such as a keyboard, a keypad, a mouse, and the like), a user output device (such as a display, a speaker, and the like), an input port, an output port, a receiver, a transmitter, one or more storage devices (e.g., a tape drive, a floppy drive, a hard disk drive, a compact disk drive, and the like), or the like, as well as various combinations thereof).

It will be appreciated that computer 600 depicted in FIG. 6 provides a general architecture and functionality suitable for implementing functional elements described herein and/or portions of functional elements described herein. For example, computer 600 provides a general architecture and functionality suitable for implementing one or more of an endpoint 110, a device 115, or MDTS 130.

It will be appreciated that the functions depicted and described herein may be implemented in software (e.g., via implementation of software on one or more processors, for executing on a general purpose computer (e.g., via execution by one or more processors) so as to implement a special purpose computer, and the like) and/or may be implemented in hardware (e.g., using a general purpose computer, one or more application specific integrated circuits (ASIC), and/or any other hardware equivalents).

It will be appreciated that some of the steps discussed herein as software methods may be implemented within hardware, for example, as circuitry that cooperates with the processor to perform various method steps. Portions of the functions/elements described herein may be implemented as a computer program product wherein computer instructions, when processed by a computer, adapt the operation of the computer such that the methods and/or techniques described herein are invoked or otherwise provided. Instructions for invoking the inventive methods may be stored in fixed or removable media, transmitted via a data stream in a broadcast or other signal bearing medium, and/or stored within a memory within a computing device operating according to the instructions.

It will be appreciated that the term "or" as used herein refers to a non-exclusive "or," unless otherwise indicated (e.g., use of "or else" or "or in the alternative").

It will be appreciated that, although various embodiments which incorporate the teachings presented herein have been shown and described in detail herein, those skilled in the art can readily devise many other varied embodiments that still incorporate these teachings.

What is claimed is:

1. A computer, comprising:
   a processor and a memory communicatively connected to the processor, the processor configured to:
   determine, based on device status information from an operating system of the computer, respective device statuses of a microphone associated with the computer and a speaker associated with the computer; and
   based on a determination that the respective device statuses of the microphone and the speaker are indicative that the microphone and the speaker are functioning properly:
   generate an audio signal;
   propagate the audio signal toward the speaker for playout via the speaker;
   monitor a signal received from the microphone for detection of the audio signal; and
   determine whether the speaker and the microphone are functioning properly based on a determination as to whether the signal received from the microphone includes the audio signal.

2. The computer of claim 1, wherein the audio signal comprises a monotone signal generated at a specific frequency.

3. The computer of claim 1, wherein the processor is configured to:
   propagate, toward a management system, an indication as to whether the microphone and the speaker are functioning properly.

4. A computer, comprising:
   a processor and a memory communicatively connected to the processor, the processor configured to:
   receive, at the computer from a management system, a set of test scripts configured to test a set of media devices associated with the computer, the set of test scripts comprising a first test script configured to test a camera associated with the computer and a second test script configured to test a microphone and a speaker associated with the computer;
   execute the first test script for determining whether the camera is functioning properly, wherein the first test script comprises instructions which, when executed by the processor, cause the processor to:
   propagate, toward the camera, at least one instruction configured to cause the camera to capture a set of images;
   receive the set of images captured via the camera; and
   determine whether the camera is functioning properly based on processing of the set of images;
   execute the second test script for determining whether the microphone and the speaker are functioning properly; and propagate, toward the management system, first test results indicative as to whether the camera is functioning properly and second test results indicative as to whether the microphone and the speaker are functioning properly.

5. The computer of claim 4, wherein the second test script comprises instructions which, when executed by the processor, cause the processor to:
generate an audio signal;
propagate the audio signal toward the speaker for playout via the speaker;
monitor a signal received from the microphone for detection of the audio signal; and
determine whether the speaker and the microphone are functioning properly based on a determination as to whether the signal received from a microphone includes the audio signal.

6. The computer of claim 4, wherein the processor is configured to:
determine, based on a testing schedule, that the camera is to be tested and that the microphone and the speaker are to be tested; and
send, from the computer toward the management system, a request for the set of test scripts.

7. The computer of claim 4, wherein the set of images includes a given image, wherein, to determine whether the camera is functioning properly based on processing of the given image, the processor is configured to:
determine an average intensity of the given image; and
determine whether the camera is functioning properly based on a determination as to whether the average intensity of the given image satisfies a threshold.

8. The computer of claim 4, wherein the set of images includes a given image, wherein, to determine whether the camera is functioning properly based on processing of the given image, the processor is configured to: determine a set of local intensities associated with a respective set of local regions of the given image; and determine whether the camera is functioning properly based on the set of local intensities.

9. The computer of claim 8, wherein, to determine whether the camera is functioning properly based on the set of local intensities, the processor is configured to:
evaluate at least a portion of the local intensities with respect to a threshold; and
determine whether a threshold number of the local intensities satisfy the threshold.

10. The computer of claim 4, wherein the at least one instruction comprises at least one instruction configured to cause the camera to capture a first image based on a first configuration of the camera and to cause the camera to capture a second image based on a second configuration of the camera, wherein the first configuration of the camera and the second configuration of the camera are different.

11. The computer of claim 10, wherein at least one setting of the camera is different between the first configuration of the camera and the second configuration of the camera, the at least one setting being at least one of a pan setting of the camera, a tilt setting of the camera, or a zoom setting of the camera.

12. The computer of claim 4, wherein the set of images includes a first image captured based on a first configuration of the camera and a second image captured based on a second configuration of the camera, wherein the first configuration of the camera and the second configuration of the camera are different.

13. The computer of claim 12, wherein, to determine whether the camera is functioning properly based on processing of the set of images, the processor is configured to:
determine whether there is a difference or a threshold amount of difference between content of the first image and content of the second image.

14. The computer of claim 4, wherein the at least one instruction comprises:
an instruction configured to cause a light source to generate a light pulse; and
an instruction configured to cause the camera to capture the set of images contemporaneous with generation of the light pulse.

15. The computer of claim 14, wherein, to determine whether the camera is functioning properly based on processing of the set of images, the processor is configured to:
determine whether at least one image in the set of images includes the light pulse.

16. The computer of claim 4, wherein the processor is configured to: prior to propagating the at least one instruction configured to cause the camera to capture a set of images: determine, based on information from an operating system of the computer, whether a device status of the camera is indicative that the camera is functioning properly.

17. The computer of claim 4, wherein the processor is configured to: propagate, toward a management system, an indication as to whether the camera is functioning properly.

* * * * *